(12) United States Patent
Parker (10) Patent No.: US 10,888,149 B1
(45) Date of Patent: Jan. 12, 2021

(54) BACKPACKS THAT USE MAGNETIC FORCES TO ALTER LOAD DISTRIBUTION

(71) Applicant: Andrea Jean Parker, Gresham, OR (US)

(72) Inventor: Andrea Jean Parker, Gresham, OR (US)

( * ) Notice: Subject to any disclaimer, the term of this patent is extended or adjusted under 35 U.S.C. 154(b) by 0 days.

(21) Appl. No.: 16/540,337

(22) Filed: Aug. 14, 2019

(51) Int. Cl.
| | |
|---|---|
| *A45F 3/04* | (2006.01) |
| *A45F 3/00* | (2006.01) |
| *F16F 6/00* | (2006.01) |

(52) U.S. Cl.
CPC .......... *A45F 3/04* (2013.01); *A45F 2003/003* (2013.01); *F16F 6/005* (2013.01)

(58) Field of Classification Search
CPC ...... A45F 3/04; A45F 2003/003; A45C 13/02; A45C 2013/026; F16F 6/005
USPC ................................. 224/645, 183
See application file for complete search history.

(56) References Cited

U.S. PATENT DOCUMENTS

| | | | | |
|---|---|---|---|---|
| 9,754,711 | B2* | 9/2017 | Janssen | ................ H01F 7/0236 |
| 2005/0082447 | A1 | 4/2005 | Chuang | |
| 2007/0233251 | A1 | 10/2007 | Abdou | |
| 2007/0275797 | A1 | 11/2007 | Brunner | |
| 2008/0120865 | A1 | 5/2008 | Smith | |
| 2008/0200092 | A1 | 8/2008 | Chung | |
| 2012/0251277 | A1* | 10/2012 | Corcoran | ................ B63C 15/00 |
| | | | | 414/267 |
| 2013/0026005 | A1 | 1/2013 | Senn | |
| 2013/0125294 | A1 | 5/2013 | Ferrara | |
| 2013/0319803 | A1 | 12/2013 | Lee | |
| 2018/0147552 | A1 | 5/2018 | Niazi | |
| 2018/0295959 | A1* | 10/2018 | Derryberry | ........ A45C 13/1069 |
| 2020/0037719 | A1* | 2/2020 | Jaworski | .................. A45C 5/02 |

FOREIGN PATENT DOCUMENTS

GB 2283668 * 10/1993 ............... A45C 7/00

* cited by examiner

*Primary Examiner* — Adam J Waggenspack
(74) *Attorney, Agent, or Firm* — UCLA Patent Law Clinic (57) ABSTRACT

A backpack that uses magnetic forces to alter the load distribution on a user in accordance with embodiments of the invention are disclosed. In one embodiment, a backpack for changing load distribution on a user comprising: an outer portion comprising; a compartment to hold an inner portion; an opening; the inner portion comprising; a compartment configured for a load; an opening; a first plurality of magnets on the outer portion, wherein the first plurality of magnets is: oriented such that a consistent magnetic pole of each magnet points towards the compartment; a second plurality of magnets on the inner portion, wherein the second plurality of magnets is; oriented such that a consistent magnetic pole of each magnet points towards the compartment; wherein the first plurality of magnets is oriented such that a magnetic field of the first plurality of magnets exerts a repulsive force on the second plurality of magnets.

20 Claims, 11 Drawing Sheets

FIG. 11B

US 10,888,149 B1

BACKPACKS THAT USE MAGNETIC FORCES TO ALTER LOAD DISTRIBUTION

FIELD OF THE INVENTION

The present invention generally relates to backpacks and more specifically to backpacks that use magnetic forces to alter the load distribution on a user.

BACKGROUND

A backpack is a pack carried on a user's back. It typically includes two straps that are attached to the pack and go over the user's shoulders. Some backpacks have rigid frames that are attached to the straps. Some backpacks are merely cloth sacks. Backpacks are commonly used by various people such as hikers, students, and/or the military.

Special purpose backpacks exist for carrying specific goods like computers or food. Such backpacks may have added shock absorbing or thermal insulating materials. Other backpacks may feature wheels for rolling. Some larger backpacks have integrated hip belts which transfer the load from the user's shoulders to the user's hips. Other backpacks may be used as water bladders for athletes. Still other backpacks may be fitted with solar panels or batteries.

SUMMARY OF THE INVENTION

The various embodiments of the present backpacks that use magnetic forces to alter load distribution on a user contain several features, no single one of which is solely responsible for their desirable attributes. Without limiting the scope of the present embodiments, their more prominent features will now be discussed below. In particular, the present backpacks that use magnetic forces to alter load distribution on a user (may also be referred to as "wearer") will be discussed in the context of particular arrangements. However, the use of the various arrangements are merely exemplary and various other arrangements may be utilized for other applications in accordance with various embodiments of the invention. After considering this discussion, and particularly after reading the section entitled "Detailed Description," one will understand how the features of the present embodiments provide the advantages described here.

One aspect of the present embodiments includes the realization that in current backpacks, other than the present embodiments, objects in a backpack (may also be referred to as "pack" or "bag") may jut uncomfortably into the wearer's back and/or apply pressure to a specific area of the wearer. The present embodiments solve these problems by utilizing various arrangement of magnets which spread the forces applied by an object inside the bag on the user. The present embodiments thus advantageously enable magnetic load distribution. The present embodiments provide these advantages and enhancements, as described below.

In a first aspect, a backpack for changing load distribution on a user comprising: an outer portion comprising; a first compartment configured to hold an inner portion; a first closable opening; the inner portion positioned inside the outer portion comprising; a second compartment configured to hold a load; a second closable opening, wherein the first closable opening and second closable opening are aligned such that the load passes through the first closable opening and the second closable opening into the second compartment; a first plurality of magnets attached to the outer portion, wherein the first plurality of magnets is: oriented such that a consistent magnetic pole of each magnet of the first plurality of magnets points towards the first compartment; and constrained such that the distance between any two magnets of the first plurality of magnets is fixed; a second plurality of magnets attached to the inner portion, wherein the second plurality of magnets is; oriented such that a consistent magnetic pole of each magnet of the second plurality of magnets points towards the first compartment; and constrained such that the distance between any two magnets of the second plurality of magnets is fixed; wherein the first plurality of magnets is oriented such that a magnetic field of the first plurality of magnets exerts a repulsive force on the second plurality of magnets.

In an embodiment of the first aspect, the first plurality of magnets is oriented such that a magnetic pole of each magnet points perpendicularly to a closest surface of the inner portion.

In another embodiment of the first aspect, the second plurality of magnets is oriented such that a magnetic pole of each magnet points perpendicular to closest surface of outer portion.

In another embodiment of the first aspect, the first plurality of magnets is oriented such that a magnetic pole of each magnet points through an approximate center of volume of the inner portion.

In another embodiment of the first aspect, the second plurality of magnets is oriented such that a magnetic pole of each magnet points through an approximate center of volume of the inner portion.

In another embodiment of the first aspect, a space between the inner portion and the outer portion is airtight.

In another embodiment of the first aspect, the first plurality of magnets and the second plurality of magnets are electromagnets.

In another embodiment of the first aspect, the plurality of magnets and the second plurality of magnets are permanent magnets.

In another embodiment of the first aspect, the outer portion and inner portion are both rigid.

In another embodiment of the first aspect, the first plurality of magnets is removably attached to the outer portion and the second plurality of magnets is removably attached to the inner portion In a second aspect, a backpack for changing load distribution on a user comprising: an outer portion comprising; a first compartment configured to hold an inner portion; a first closable opening; the inner portion positioned inside the outer portion comprising; a second compartment configured to hold a load; a second closable opening, wherein the first closable opening and second closable opening are aligned such that the load passes through the first closable opening and the second closable opening into the second compartment; a magnetic connective damper comprising; a first magnet abutting the outer portion; a second magnet abutting the inner portion wherein the second magnet is arranged such that a consistent magnetic pole of both the first magnet and the second magnet points towards the space between the outer portion and the inner portion along a first axis wherein the first axis extends in a line from the first magnet to the second magnet; a flexible sleeve between the first magnet and second magnet wherein the flexible sleeve; permits the first and second magnet to translate along the first axis; permits the first magnet and the second magnet to translate along a second axis up to a maximum displacement magnitude wherein the second axis is perpendicular to the first axis; and prevents the first and second magnet from translating along the second axis in excess of the maximum displacement magnitude.

In an embodiment of the second aspect, a space between the inner portion and the outer portion is airtight.

In another embodiment of the second aspect, the first magnet and second magnet are electromagnets.

In another embodiment of the second aspect, the magnet and second magnet are permanent magnets.

In another embodiment of the second aspect, the outer portion and inner portion are both rigid.

In another embodiment of the second aspect, the flexible sleeve is elastic along the first axis.

In another embodiment of the second aspect, the flexible sleeve is comprised of a plurality of rigid sections which translate relative to each other.

In another embodiment of the second aspect, the magnetic connective damper is removably attached to the outer portion and the inner portion.

In another embodiment of the second aspect, the first magnet is attached to the outer portion, and the second magnet is attached to the inner portion, and the flexible sleeve is connected to the first magnet at one end and the second magnet at the other.

In another embodiment of the second aspect, the first magnet is attached to the flexible sleeve, and the second magnet is attached to the flexible sleeve, and the flexible sleeve is removably attached to the outer portion and the inner portion.

BRIEF DESCRIPTION OF THE DRAWINGS

The various embodiments of the present backpacks that use magnetic forces to alter load distribution on a user will be discussed in detail with an emphasis on highlighting the advantageous features. These embodiments depict the novel and non-obvious use backpacks utilizing magnetic forces to alter load distribution shown in the accompanying drawings, which are for illustrative purposes only. These drawings include the following figures.

DETAILED DESCRIPTION OF THE DRAWINGS

The following detailed description describes the present embodiments with reference to the drawings. In the drawings, reference numbers label elements of the present embodiments. These reference numbers are reproduced below in connection with the discussion of the corresponding drawing features.

Turning now to the drawings, backpacks for changing load distribution on a wearer in accordance with embodiments of the invention are disclosed. In a variety of embodiments, a backpack may have an outer portion. In many embodiments, the outer portion may include a first compartment to hold an inner portion and a closable opening. In various embodiments, there may be an inner portion positioned inside the outer portion. In some embodiments, the inner portion may include a compartment configured to hold a load and may have a closable opening. In several embodiments, the closable opening on the outer portion may be aligned with the closable opening on the inner portion such that a load going into the backpack may pass first through the closable opening on the outer portion and then directly through the aligned closable opening on the inner portion. In many embodiments, the backpack may include a first plurality of magnets attached to the outer portion. In various embodiments, the first plurality of magnets may be arranged such that a consistent magnetic pole of each magnet points towards the first compartment. In some embodiments, the relative motion between the magnets in the first plurality of magnets may be constrained to be minimal. In several embodiments, a second plurality of magnets may be attached to the inner portion. In various embodiments, the magnets of the second plurality may be oriented such that a consistent magnetic pole of each magnet points towards the first compartment. In some embodiments, the relative motion between the magnets in the second plurality may be constrained to be minimal. In several embodiments, the orientation of the magnetic fields of the first plurality of magnets may be such that the magnetic fields of the first plurality of magnets exerts a repulsive force on the second plurality of magnets. The structures and positions of components of magnetic backpacks, in accordance with embodiments of the invention, are further discussed below.

Structure of Backpacks

Figure 1:
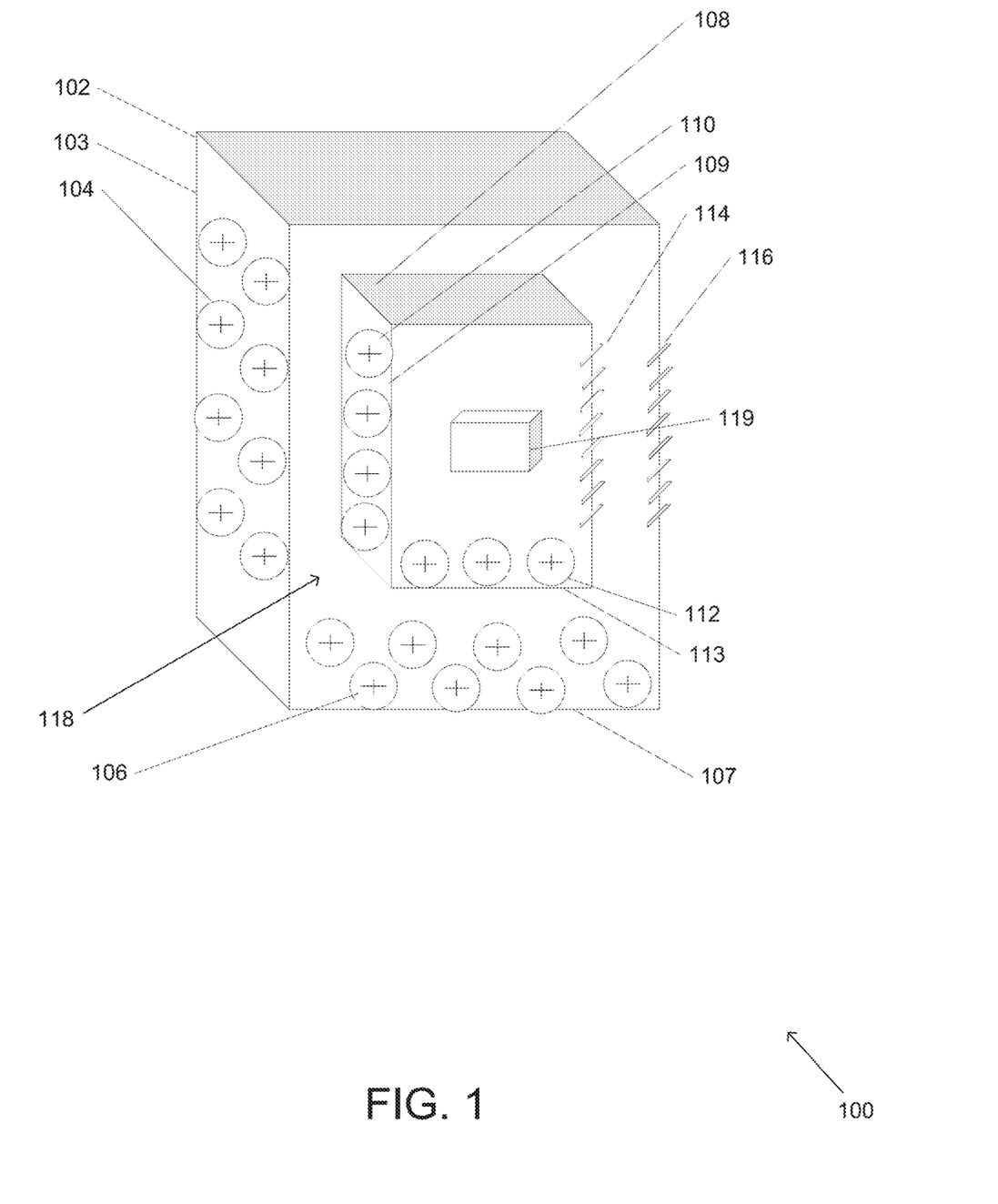
FIG. 1 is an isometric schematic diagram illustrating a magnetic backpack for changing load distribution on the wearer in accordance with an embodiment of the invention.

A backpack may include various mechanical structures and/or layouts for altering the load distribution on the wearer. An isometric schematic diagram illustrating a magnetic backpack for changing load distribution on the wearer in accordance with an embodiment of the invention is shown in FIG. 1. As illustrated, a magnetic backpack 100 for changing load distribution on the wearer may include an outer portion 102 and an inner portion 108. In some embodiments, the outer portion 102 may be made from rigid materials. For example, the outer portion 102 may be made of metal, fabric, wood, plastic, and/or other materials. In some embodiments, the inner portion 108 may be made from rigid materials. For example, the inner portion 108 may be made of metal, fabric, wood, plastic, and/or other materials. In various embodiments, the inner portion 108 may be positioned inside the outer portion 102. In some embodiments, the outer portion 102 may be hollow to allow the inner portion 108 to be inside. The inner portion 108 may also be hollow to allow a load 119 to fit inside inner portion 108. In many embodiments, a first surface 103 may abut the wearer's back when the backpack is worn. Further, a third surface 107 may face towards the ground.

In reference to FIG. 1, a first closable opening 116 may allow outer portion 102 to be opened. Second closable opening 114 may allow inner portion 108 to be opened. Opening the first closable opening 116 may allow a user to access the second closable opening 114. When a user opens both the first closable opening 116 and the second closable opening 114 the uses may be able to pass a load 119 through the outer portion 102 and place the load 119 into the inner portion 108.

In further reference to FIG. 1, first magnets 104 may be attached to first surface 103. In some embodiments, all the first magnets 104 have the same magnetic pole facing towards second surface 109. Second magnets 110 may be attached to second surface 109. In some embodiments, all the second magnets 110 may have the same magnetic pole facing towards the first surface 103. Further, the first magnets 104 and the second magnets 110 may have the same magnetic pole facing towards the interstitial space 118. In this way the first magnets 104 and second magnets 110 may tend to exert a repulsive magnetic force on each other. The result of this force would be that the first surface 103 and second surface 109 are pushed apart. In some embodiments, third magnets 106 may be attached to third surface 107. In some embodiments, all the third magnets 106 have the same magnetic pole facing towards a fourth surface 113. In some embodiments, fourth magnets 112 may be attached to the fourth surface 113. In some embodiments, all the fourth magnets 112 have the same magnetic pole facing towards the third surface 107. Further, the third magnets 106 and the fourth magnets 112 may have the same magnetic pole facing towards the interstitial space 118. In this way the third magnets 106 and fourth magnets 112 may tend to exert a repulsive magnetic force on each other. The result of this force would be that the third surface 107 and fourth surface 113 are pushed apart.

In further reference to FIG. 1, in some embodiments, the outer portion 102 and inner portion 108 may be comprised of rigid materials. In these embodiments the first closable opening 116 and second closable opening 114 may be airtight with respect to the interstitial space 118. In this way the interstitial space 118 may be a pressure vessel. This interstitial space may then have the air evacuated to create a low pressure in the interstitial space 118. The result may be that heat transfer between the outer portion 102 and the inner portion 108 is slowed by an increased thermal resistance. The thermal resistance may be increased because the low pressure in the interstitial space 118 may result in a lower convective heat transfer coefficient then an interstitial space 118 at ambient pressure. In some embodiments the interstitial space 118 may be filled with various fluids, such as, but not limited to air, water, or oil. The fluids filling the interstitial space 118 may in some embodiments be pressurized or depressurized as compared to ambient conditions.

In various embodiments the first magnets 104 may be oriented such that the magnetic poles of each individual magnet of the plurality of magnets included in the first magnets 104 may be oriented such that the magnetic pole of the magnet is perpendicular to the closest surface of the inner portion 108. Further, the second magnets 110 may be oriented such that the magnetic poles of each individual magnet of the plurality of magnets included in the second magnets 110 may be oriented such that the magnetic pole of the magnet is perpendicular to the closest surface of the outer portion 102. In addition, the first magnets 104 may be oriented such that the magnetic poles of each individual magnet of the plurality of magnets included in the first magnets 104 may be oriented such that the magnetic pole of the magnet points through the approximate center of volume of the inner portion 108. Moreover, the second magnets 110 may be oriented such that the magnetic poles of each individual magnet of the plurality of magnets included in the second magnets 108 may be oriented such that the magnetic pole of the magnet points through the approximate center of volume of the outer portion 102. Furthermore, the first magnets 104, second magnets 110, third magnets 106, and/or fourth magnets 112 may be permanent magnets. In various embodiments the first magnets 104, second magnets 110, third magnets 106, and/or fourth magnets 112 may be electromagnets. In some embodiments there may be a mix of permanent and electromagnets. In addition, the first magnets 104, second magnets 110, third magnets 106, and/or fourth magnets 112 may be removably attached to the outer portion 102 and inner portion 108 respectively. In some embodiments, the first magnets 104, second magnets 110, third magnets 106, and/or fourth magnets 112 may each be a single magnet.

Figure 2:
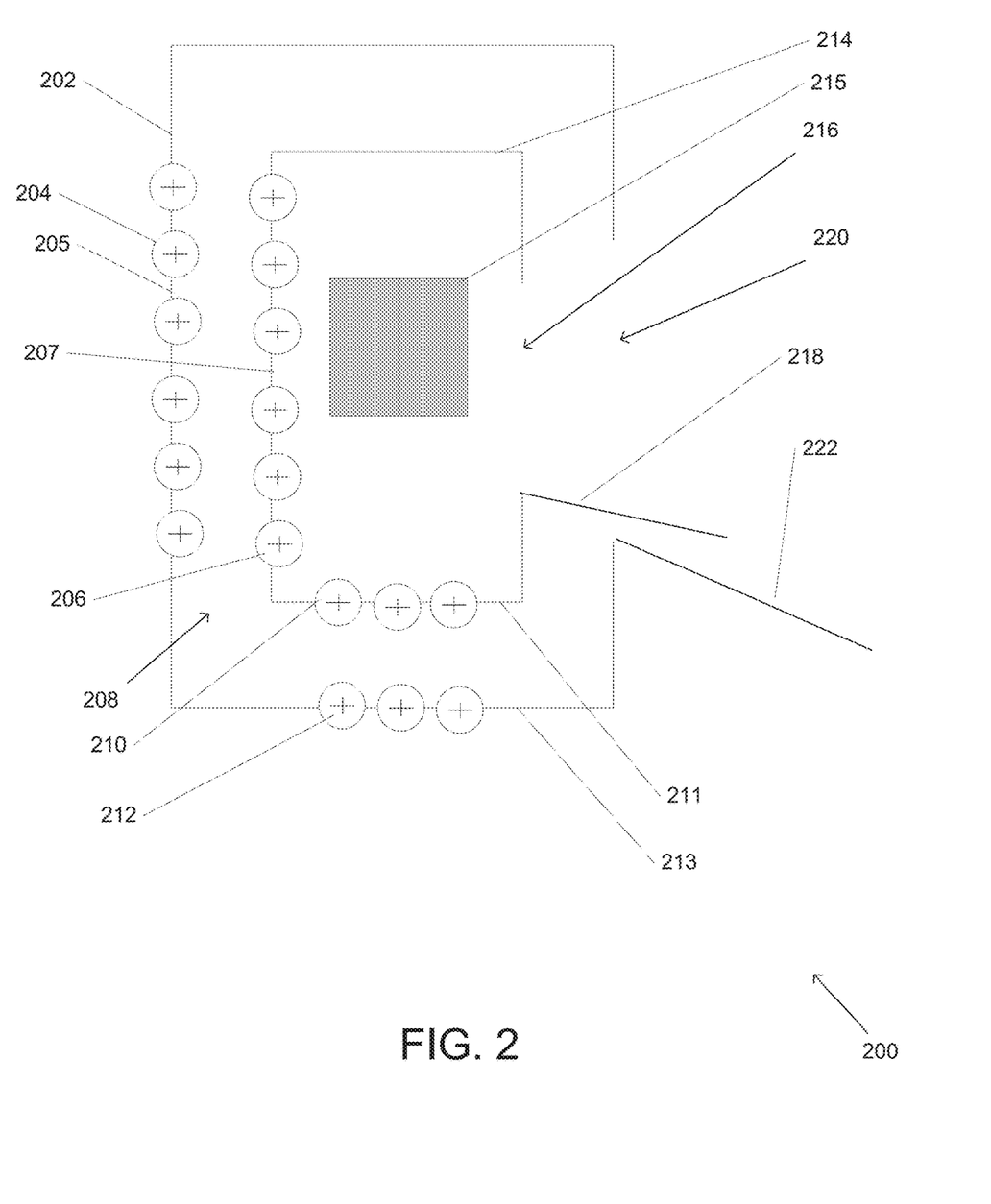
FIG. 2 is a two-dimensional schematic diagram illustrating a magnetic backpack for changing load distribution on the wearer with magnets on two or more sides in accordance with an embodiment of the invention.

A two-dimensional schematic diagram illustrating an embodiment of a magnetic backpack for changing load distribution on the wearer with magnets on two or more sides is shown in FIG. 2. As illustrated, a magnetic backpack 200 for changing load distribution on the wearer may include an outer portion 202 and an inner portion 214. In various embodiments, the inner portion 214 may be positioned inside the outer portion 202. The outer portion 202 may be hollow to allow the inner portion 214 to be inside. The inner portion 214 may also be hollow to allow a load 215 to fit inside inner portion 214. In many embodiments, a first surface 205 may abut the wearer's back when the backpack is worn. Further, a third surface 213 may face towards the ground.

In reference to FIG. 2, a first closable opening 222 may allow outer portion 202 to be opened. Second closable opening 218 may allow inner portion 214 to be opened. Opening the first closable opening 222 may allow a user to access the second closable opening 218. When a user opens both the first closable opening 222 and the second closable opening 218 the user may be able to pass a load 215 through the first opening 220 and the second opening 216 into the inner portion 214.

In further reference to FIG. 2, first magnets 204 may be attached to first surface 205. In some embodiments, all the first magnets 204 have the same magnetic pole facing towards second surface 207. Second magnets 206 may be attached to second surface 207. In some embodiments, all the second magnets 206 may have the same magnetic pole facing towards the first surface 205. Further, the first magnets 204 and the second magnets 206 may have the same magnetic pole facing towards the interstitial space 208. In this way the first magnets 204 and second magnets 206 may tend to exert a repulsive magnetic force on each other. The result of this force would be that the first surface 205 and second surface 207 are pushed apart. Third magnets 212 may be attached to third surface 213. In some embodiments, all the third magnets 212 have the same magnetic pole facing towards fourth surface 211. Fourth magnets 210 may be attached to fourth surface 211. In some embodiments, all the fourth magnets 210 have the same magnetic pole facing towards the third surface 213. Further, the third magnets 212 and the fourth magnets 211 may have the same magnetic pole facing towards the interstitial space 208. In this way the third magnets 212 and fourth magnets 210 may tend to exert a repulsive magnetic force on each other. The result of this force would be that the third surface 213 and fourth surface 211 are pushed apart. In some embodiments, the first magnets 204, second magnets 206, third magnets 212, and/or fourth magnets 210 may each be a single magnet.

Figure 6:
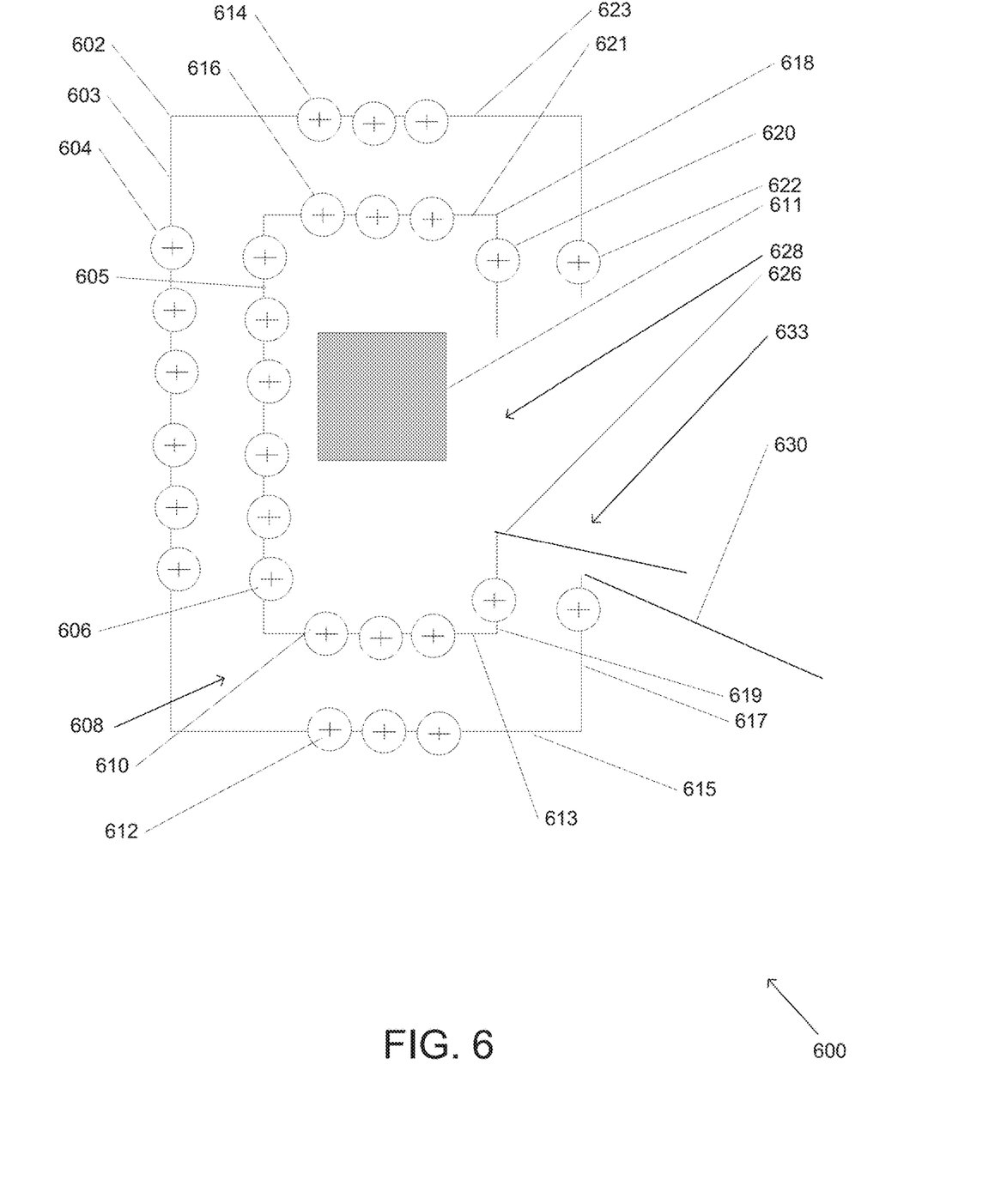
FIG. 6 is a two-dimensional schematic diagram illustrating a magnetic backpack for changing load distribution on the wearer with magnets on four or more sides in accordance with an embodiment of the invention.

A two-dimensional schematic diagram illustrating an embodiment of a magnetic backpack for changing load distribution on the wearer with magnets on four or more sides is shown in FIG. 6. As illustrated, a magnetic backpack 600 for changing load distribution on the wearer may include an outer portion 602 and an inner portion 618. In various embodiments, the inner portion 618 may be positioned inside the outer portion 602. The outer portion 602 may be hollow to allow the inner portion 618 to be inside. The inner portion 618 may also be hollow to allow a load 611 to fit inside inner portion 618. In many embodiments, a first surface 603 may abut the wearer's back when the backpack is worn. Further, a third surface 615 may face towards the ground.

In reference to FIG. 6, a first closable opening 630 may allow outer portion 602 to be opened. Second closable opening 626 may allow inner portion 618 to be opened. Opening the first closable opening 630 may allow a user to access the second closable opening 626. When a user opens both the first closable opening 630 and the second closable opening 626 the user may be able to pass a load 611 through the first opening 633 and the second opening 628 into the inner portion 618.

In further reference to FIG. 6, first magnets 604 may be attached to first surface 603. In some embodiments, all the first magnets 604 have the same magnetic pole facing towards second surface 605. Second magnets 606 may be attached to second surface 605. In some embodiments, all the second magnets 606 may have the same magnetic pole facing towards the first surface 603. Further, the first magnets 604 and the second magnets 606 may have the same magnetic pole facing towards the interstitial space 608. In this way the first magnets 604 and second magnets 606 may tend to exert a repulsive magnetic force on each other. The result of this force would be that the first surface 603 and second surface 605 are pushed apart. Third magnets 612 may be attached to third surface 615. In some embodiments, all the third magnets 612 have the same magnetic pole facing towards fourth surface 613. Fourth magnets 610 may be attached to fourth surface 613. In some embodiments, all the fourth magnets 610 have the same magnetic pole facing towards the third surface 615. Further, the third magnets 612 and the fourth magnets 613 may have the same magnetic pole facing towards the interstitial space 608. In this way the third magnets 612 and fourth magnets 610 may tend to exert a repulsive magnetic force on each other. The result of this force would be that the third surface 615 and fourth surface 613 are pushed apart. Eighth magnets 614 may be attached to eighth surface 623. In some embodiments, all the eighth magnets 614 have the same magnetic pole facing towards seventh surface 621. Seventh magnets 616 may be attached to seventh surface 621. In some embodiments, all the seventh magnets 616 may have the same magnetic pole facing towards the eighth surface 623. Further, the eighth magnets 614 and the seventh magnets 616 may have the same magnetic pole facing towards the interstitial space 608. In this way the eighth magnets 614 and seventh magnets 616 may tend to exert a repulsive magnetic force on each other. The result of this force would be that the eighth surface 623 and seventh surface 621 are pushed apart. Fifth magnets 622 may be attached to fifth surface 617. In some embodiments, all the fifth magnets 622 have the same magnetic pole facing towards sixth surface 619. Sixth magnets 620 may be attached to sixth surface 619. In some embodiments, all the sixth magnets 620 have the same magnetic pole facing towards the fifth surface 617. Further, the fifth magnets 622 and the fourth magnets 613 may have the same magnetic pole facing towards the interstitial space 608. In this way the fifth magnets 622 and sixth magnets 620 may tend to exert a repulsive magnetic force on each other. The result of this force would be that the fifth surface 617 and sixth surface 619 are pushed apart. In some embodiments, the first magnets 604, second magnets 606, third magnets 612, fourth magnets 610, fifth magnets 622, sixth magnets 620, seventh magnets 616 and/or eighth magnets 614 may each be a single magnet.

Although specific layouts for magnetic backpacks for changing load distribution on a wearer are discussed above with respect to FIG. 1, FIG. 2, and FIG. 6 any of a variety of components and layouts for changing load distribution on a wearer utilizing magnets, portions, and other components as appropriate to the requirements of a specific application can be utilized in accordance with embodiments of the invention. Magnetic connective dampers, which may be used as an alternative or in conjunction with independent magnets, in accordance with embodiments of the invention are discussed further below.

Magnetic Connective Dampers

As an alternative to using magnets attached to the inner portion and outer portion, some embodiments may include magnetic connective dampers. These magnetic connective dampers may include magnets and a flexible sleeve.

Figure 3:
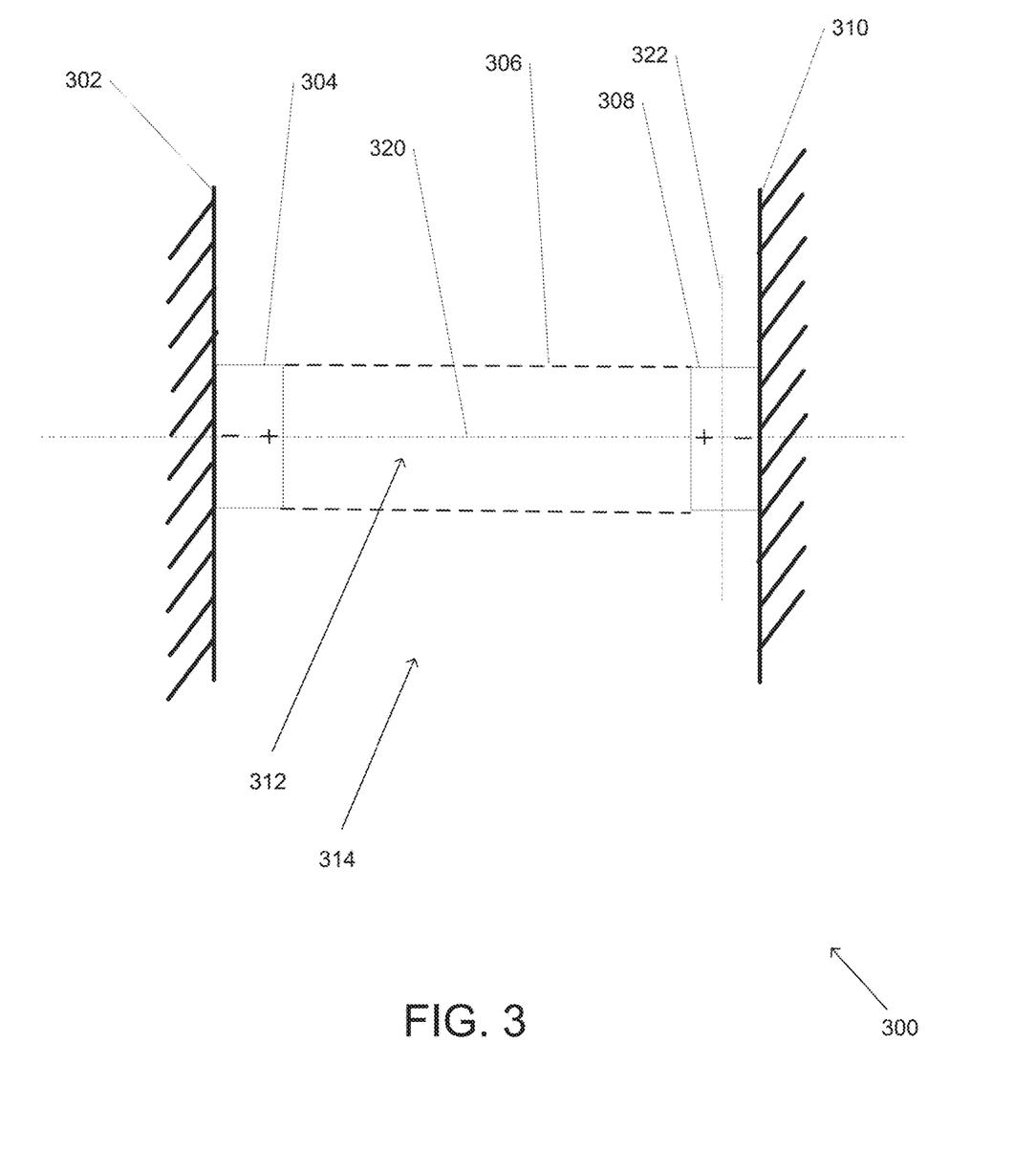
FIG. 3 is a two-dimensional schematic diagram illustrating a magnetic connective damper in accordance with an embodiment of the invention.

A schematic of an embodiment of a magnetic connective damper is shown in FIG. 3. The first magnet 304 may abut the outer portion 302. The second magnet 308 may abut the inner portion 310. First magnet 304 and second magnet 308 may lie on the same first axis 320. Second axis 322 may be perpendicular to first axis 320. A flexible sleeve 306 extends from the first magnet 304 and the second magnet 308. Inside the flexible sleeve 306 there may be a flexible sleeve space 312. Interstitial space 314 is the space between the outer portion 302 and the inner portion 310. In some embodiments the first magnet 304 may be fixed to the outer portion 302. In several embodiments the second magnet 308 may be fixed to the inner portion 310. In some embodiments the flexible sleeve 312 may be made of rigid components which translate relative to each other. In many embodiments the flexible sleeve 312 may be made of an elastic material. In many embodiments the forces on the second magnet 308, when it translates along the second axis 322 relative to the first magnet 304, are correlated with the displacement of the second magnet 308. In some embodiments the flexible sleeve space 312 may be filled with various fluids, such as, but not limited to air, water, or oil. The flexible sleeve space 312 may also be pressurized or depressurized to various pressures in various embodiments.

Figure 8:
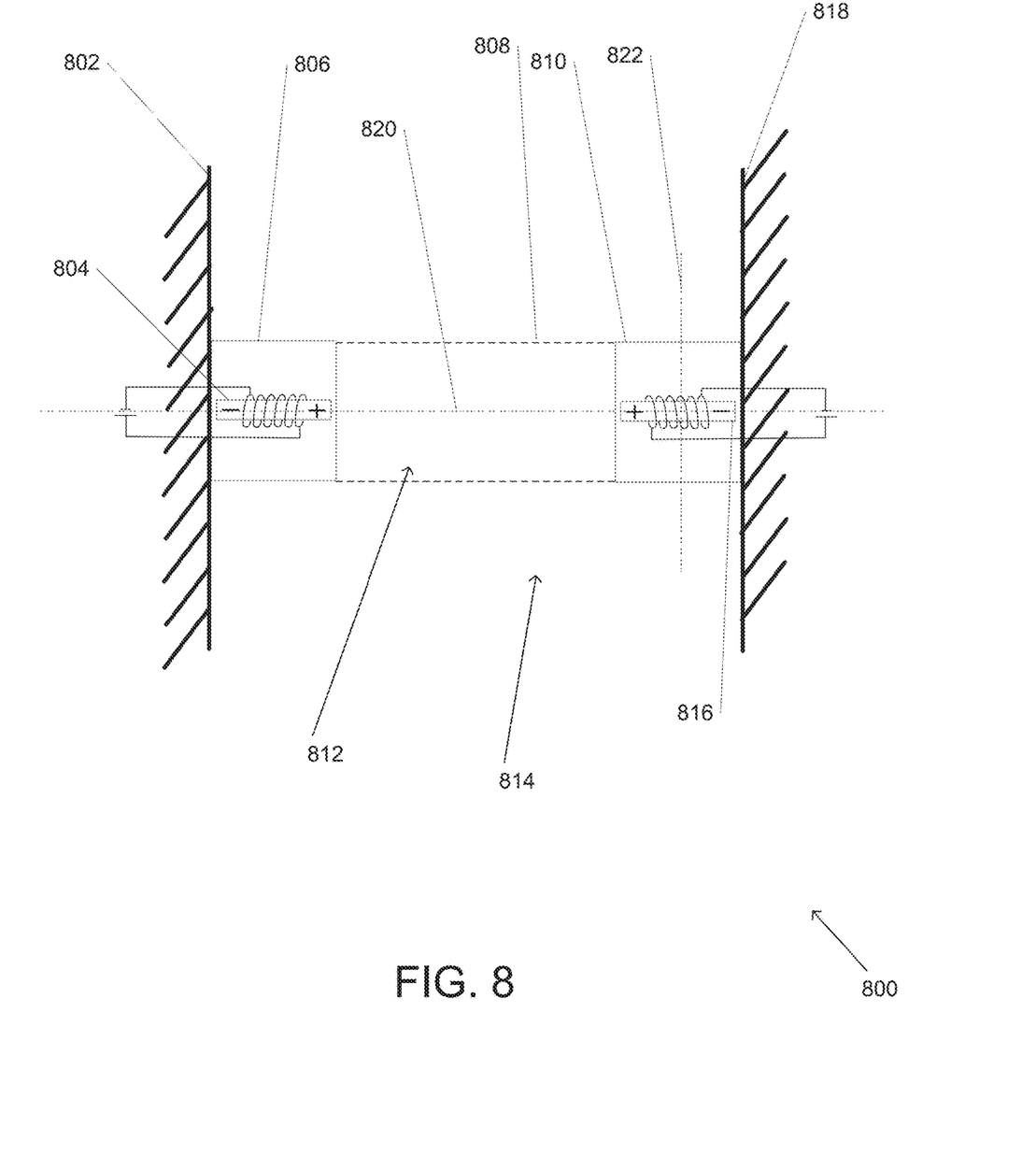
FIG. 8 is a two-dimensional schematic diagram illustrating a magnetic connective damper with electromagnets in accordance with an embodiment of the invention.

A schematic of an electromagnetic connective damper 800 is illustrated in FIG. 8. The first electromagnet 804 may abut the outer portion 802. The second electromagnet 816 may abut the inner portion 818. First electromagnet 804 and second electromagnet 816 may lie on the same first axis 820. Second axis 822 may be perpendicular to first axis 820. The first electromagnet 804 may be encapsulated in a first magnet casing 806. The second electromagnet 816 may be encapsulated in a second magnet casing 810. A flexible sleeve 808 may extend from the first magnet casing 806 and the second magnet casing 810. Inside the flexible sleeve 808 there may be a flexible sleeve space 812. Interstitial space 814 is the space between the outer portion 802 and the inner portion 818. In some embodiments the first magnet casing 806 may be fixed to the outer portion 802. In several embodiments the second magnet casing 810 may be fixed to the inner portion 818. In some embodiments the flexible sleeve 812 may be made of rigid components which translate relative to each other. In many embodiments the flexible sleeve 812 may be made of an elastic material. In many embodiments the forces on the second electromagnet 816, when it translates along the second axis 822 relative to the first electromagnet 804, are correlated with the displacement of the second electromagnet 816. In some embodiments the flexible sleeve space 812 may be filled with various fluids, such as, but not limited to air, water, or oil. The flexible sleeve space 812 may also be pressurized or depressurized to various pressures in various embodiments. In various embodiments the first electromagnet 804 may be substituted with a permanent magnet. In various embodiments the second electromagnet 816 may be substituted with a permanent magnet.

Figure 4:
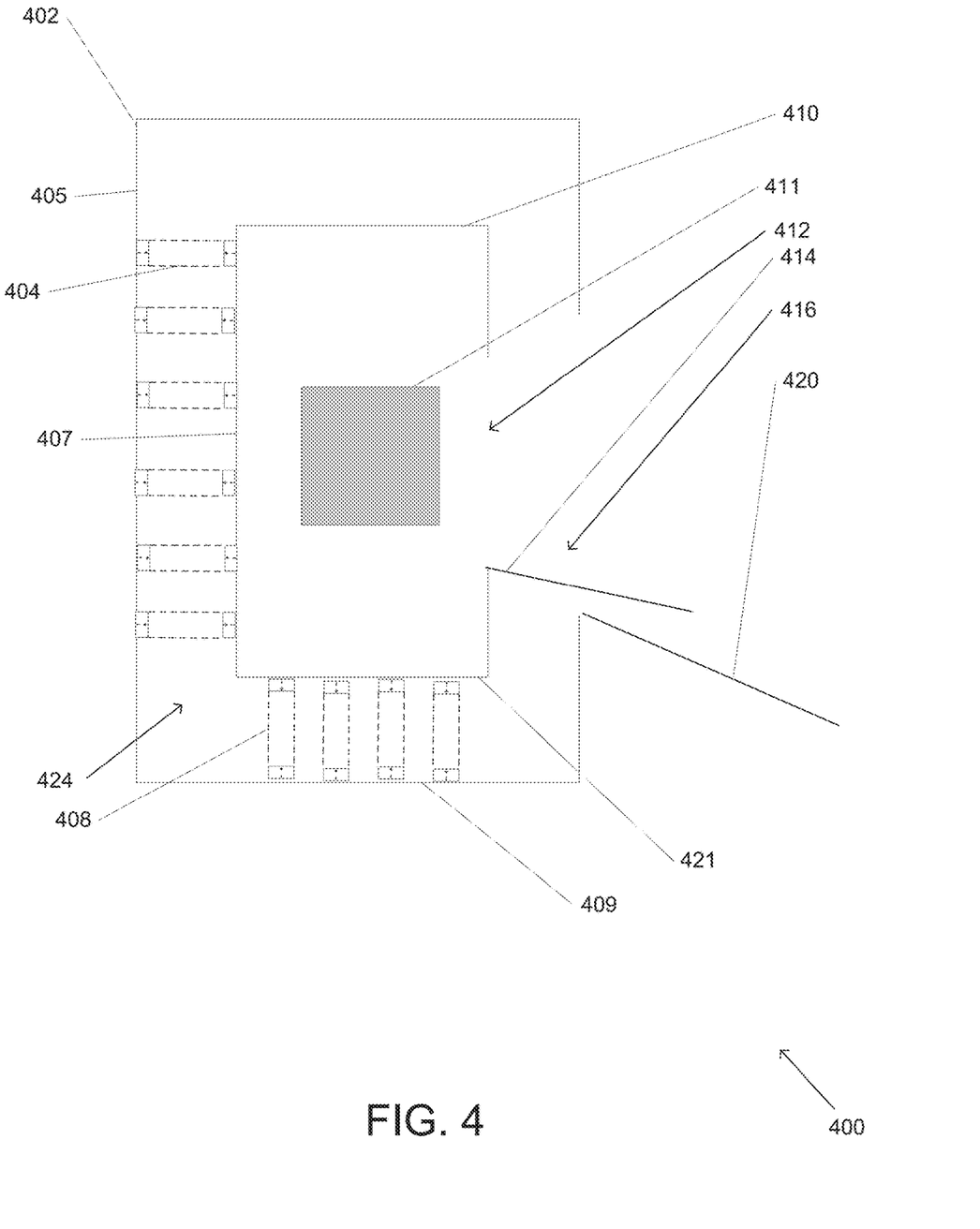
FIG. 4 is a two-dimensional schematic diagram illustrating a magnetic backpack for changing load distribution on the wearer with magnetic connective dampers on two or more sides in accordance with an embodiment of the invention.

A two-dimensional schematic diagram illustrating an embodiment of a magnetic backpack for changing load distribution on the wearer with magnet connective dampers on two or more sides is shown in FIG. 4. As illustrated, a magnetic backpack 400 for changing load distribution on the wearer may include an outer portion 402 and an inner portion 410. In various embodiments, the inner portion 410 may be positioned inside the outer portion 402. The outer portion 402 may be hollow to allow the inner portion 410 to be inside. The inner portion 410 may also be hollow to allow a load 411 to fit inside inner portion 410. In many embodiments, a first surface 405 may abut the wearer's back when the backpack is worn. Further, a third surface 409 may face towards the ground.

In reference to FIG. 4, a first closable opening 420 may allow outer portion 402 to be opened. Second closable opening 414 may allow inner portion 410 to be opened. Opening the first closable opening 420 may allow a user to access the second closable opening 414. When a user opens both the first closable opening 420 and the second closable opening 414 the user may be able to pass a load 411 through the first opening 416 and the second opening 412 into the inner portion 410.

In further reference to FIG. 4, first connective magnetic dampers 404 may be attached to first surface 405 and second surface 407. The result of arranging the first connective magnetic dampers 404 in this way may be that the first surface 405 and second surface 407 are pushed apart. Second connective magnetic dampers 408 may be attached to third surface 409 and fourth surface 421. The result of arranging the second connective magnetic dampers 408 in this way may be that the third surface 409 and fourth surface 421 are pushed apart. Interstitial space 424 is between the outer portion 402 and the inner portion 410. In some embodiments, the first connective magnetic dampers 404, and/or second connective magnetic dampers 408 may each be a single connective magnetic damper. In some embodiments the interstitial space 424 could be filled with a fluid such as air, water, oil or something else. In some embodiments the interstitial space 424 could be pressurized above or below atmospheric pressure. In some embodiments the interstitial space 424 may be filled with various fluids, such as, but not limited to air, water, or oil. The fluids filling the interstitial space 118 may in some embodiments be pressurized or depressurized as compared to ambient conditions.

Figure 5:
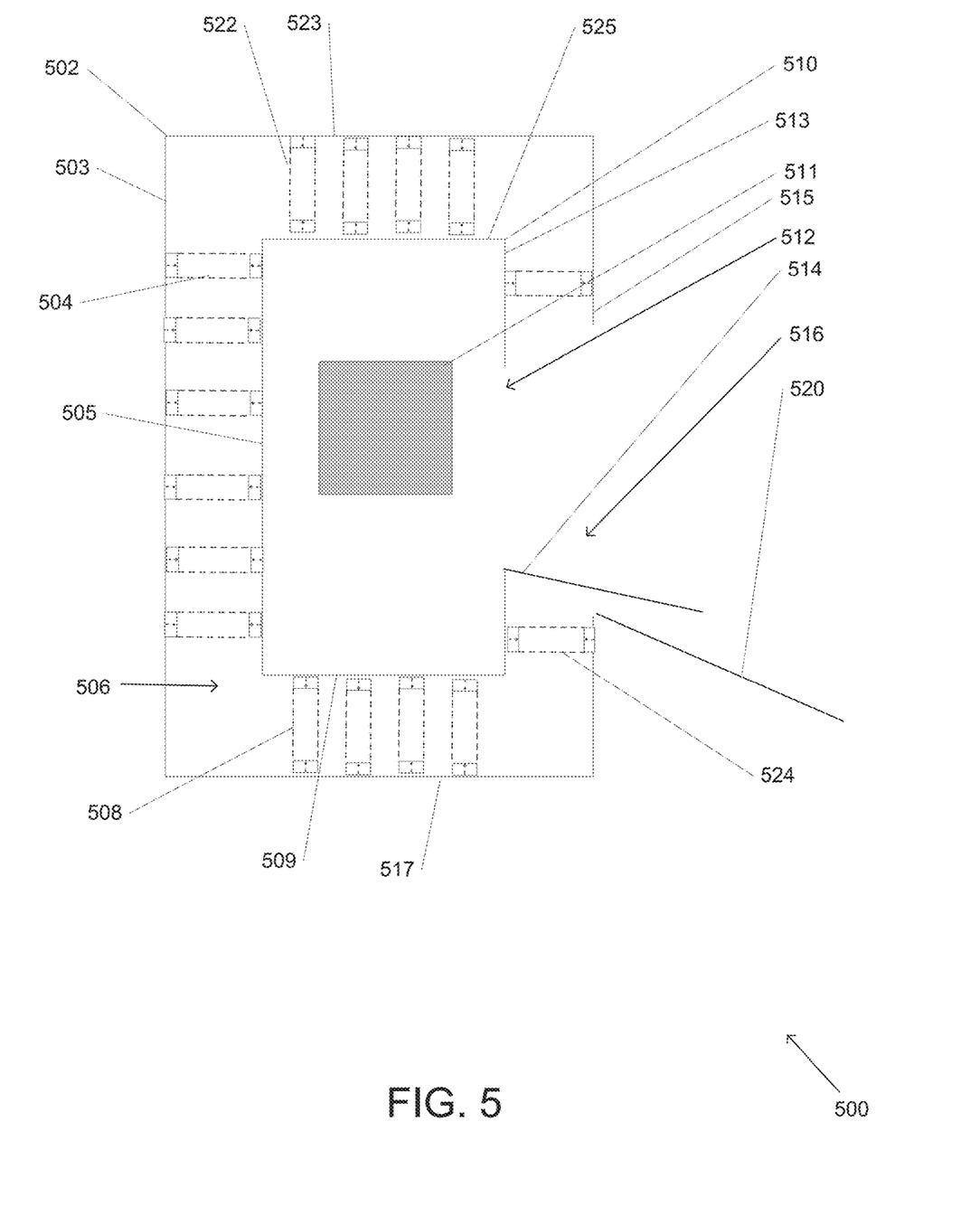
FIG. 5 is a two-dimensional schematic diagram illustrating a magnetic backpack for changing load distribution on the wearer with magnetic connective dampers on four or more sides in accordance with an embodiment of the invention.

A two-dimensional schematic diagram illustrating an embodiment of a magnetic backpack for changing load distribution on the wearer with magnet connective dampers on four or more sides is shown in FIG. 5. As illustrated, a magnetic backpack 500 for changing load distribution on the wearer may include an outer portion 502 and an inner portion 510. In various embodiments, the inner portion 510 may be positioned inside the outer portion 502. The outer portion 502 may be hollow to allow the inner portion 510 to be inside. The inner portion 510 may also be hollow to allow a load 511 to fit inside inner portion 510. In many embodiments, a first surface 503 may abut the wearer's back when the backpack is worn. Further, a third surface 517 may face towards the ground.

In reference to FIG. 5, a first closable opening 520 may allow outer portion 502 to be opened. Second closable opening 514 may allow inner portion 510 to be opened. Opening the first closable opening 520 may allow a user to access the second closable opening 514. When a user opens both the first closable opening 520 and the second closable opening 514 the user may be able to pass a load 511 through the first opening 516 and the second opening 512 into the inner portion 510.

In further reference to FIG. 5, first connective magnetic dampers 504 may be attached to first surface 503 and second surface 505. The result of arranging the first connective magnetic dampers 504 in this way may be that the first surface 503 and second surface 505 are pushed apart. Second connective magnetic dampers 508 may be attached to third surface 517 and fourth surface 509. The result of arranging the second connective magnetic dampers 508 in this way may be that the third surface 517 and fourth surface 509 are pushed apart. In further reference to FIG. 4, third connective magnetic dampers 524 may be attached to sixth surface 513 and fifth surface 515. The result of arranging the third connective magnetic dampers 524 in this way may be that the sixth surface 513 and fifth surface 515 are pushed apart. Fourth connective magnetic dampers 522 may be attached to eighth surface 523 and seventh surface 525. The result of arranging the fourth connective magnetic dampers 522 in this way may be that the eighth surface 523 and seventh surface 525 are pushed apart. Interstitial space 506 is between the outer portion 502 and the inner portion 510. In some embodiments, the first connective magnetic dampers 504, second connective magnetic dampers 508, third connective magnetic dampers 524 and/or fourth connective magnetic dampers 522 may each be a single connective magnetic damper. In some embodiments the interstitial space 506 could be filled with a fluid such as air, water, oil or something else. In some embodiments the interstitial space 506 could be pressurized above or below atmospheric pressure. In some embodiments the interstitial space 508 may be filled with various fluids, such as, but not limited to air, water, or oil. The fluids filling the interstitial space 118 may in some embodiments be pressurized or depressurized as compared to ambient conditions.

Figure 11A:
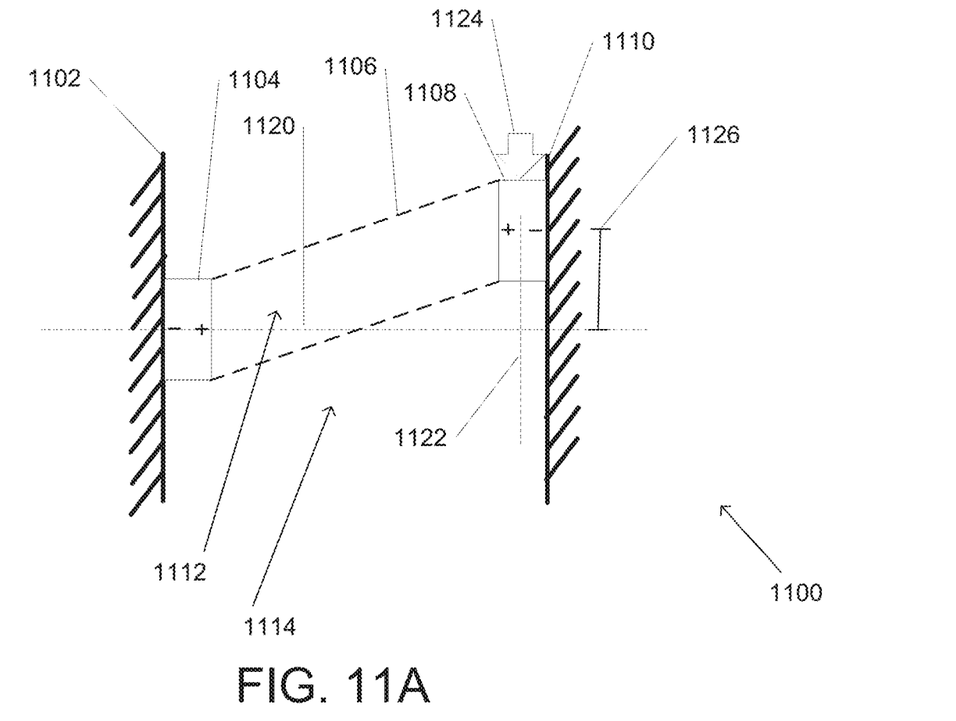
FIG. 11A is a schematic diagram showing a small force being exerted on the magnetic connective damper under a small displacement in accordance with an embodiment of the invention.

A schematic diagram showing a small force being exerted on the magnetic connective damper under a small displacement in accordance with an embodiment of the invention is shown in FIG. 11A. The first magnet 1104 may abut the outer portion 1102. The second magnet 1108 may abut the inner portion 1110. First magnet 1104 and second magnet 1108 may lie on the same first axis 1120. Second axis 1122 may be perpendicular to first axis 1120. A flexible sleeve 1106 extends from the first magnet 1104 and the second magnet 1108. Inside the flexible sleeve 1106 there may be a flexible sleeve space 1112. Interstitial space 1114 is the space between the outer portion 1102 and the inner portion 1110. In some embodiments the first magnet 1104 may be fixed to the outer portion 1102. In several embodiments the second magnet 1108 may be fixed to the inner portion 1110. In some embodiments the flexible sleeve 1112 may be made of rigid components which translate relative to each other. In many embodiments the flexible sleeve 1112 may be made of an elastic material. In many embodiments the force 1124 on the second magnet 1108, increases as the displacement 1126 increases. The force 1124 tends to push the second magnet 1108 back onto the first axis 1120.

Figure 11B:
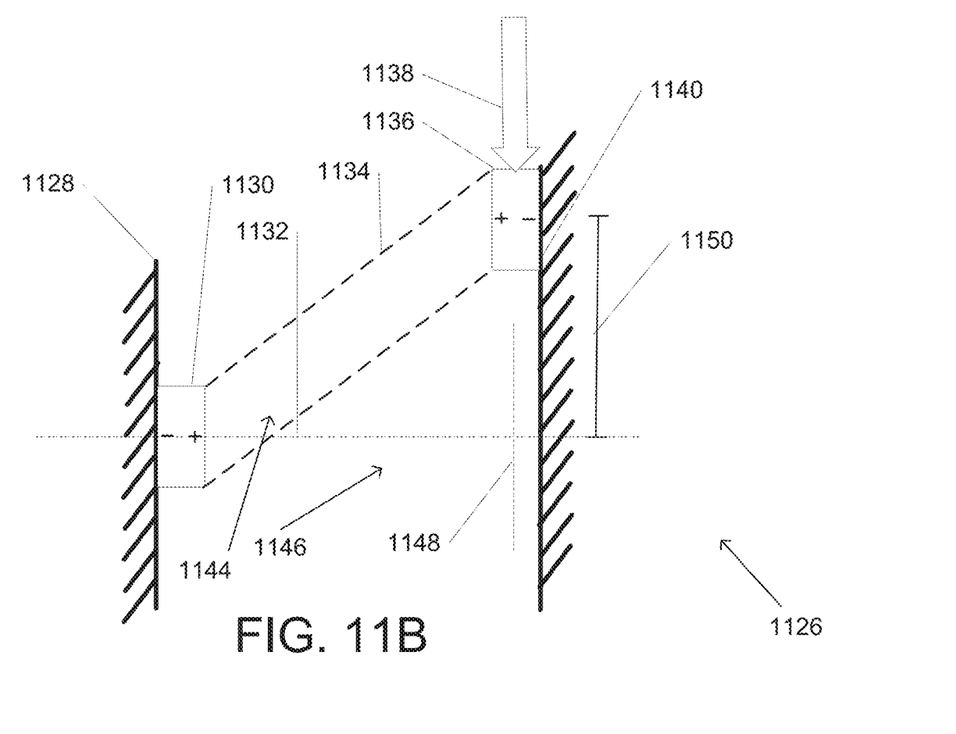
FIG. 11B is a schematic diagram showing a large force being exerted on the magnetic connective damper under a large displacement in accordance with an embodiment of the invention.

A schematic diagram showing a large force being exerted on the magnetic connective damper under a large displacement in accordance with an embodiment of the invention is shown in FIG. 11B. The first magnet 1130 may abut the outer portion 1128. The second magnet 1136 may abut the inner portion 1140. First magnet 1130 and second magnet 1136 may lie on the same first axis 1132. Second axis 1148 may be perpendicular to first axis 1132. A flexible sleeve 1134 extends from the first magnet 1130 and the second magnet 1136. Inside the flexible sleeve 1134 there may be a flexible sleeve space 1144. Interstitial space 1146 is the space between the outer portion 1128 and the inner portion 1140. In some embodiments the first magnet 1130 may be fixed to the outer portion 1128. In several embodiments the second magnet 1136 may be fixed to the inner portion 1140. In some embodiments the flexible sleeve 1134 may be made of rigid components which translate relative to each other. In many embodiments the flexible sleeve 1134 may be made of an elastic material. In many embodiments the force 1138 on the second magnet 1136, increases as the displacement 1150 increases. The force 1138 tends to push the second magnet 1136 back onto the first axis 1132.

Although specific layout for the magnetic connective damper and the magnetic backpack for changing load distribution on a wearer are discussed above with respect to FIGS. 3-5, FIG. 8, and FIG. 11A-B, any of a variety of components and layouts for changing load distribution on a wearer utilizing magnets, portions, and other components as appropriate to the requirements of a specific application can be utilized in accordance with embodiments of the invention. The force distribution considerations in accordance with embodiments of the invention are discussed further below.

Force Distribution Considerations

Figure 7A:
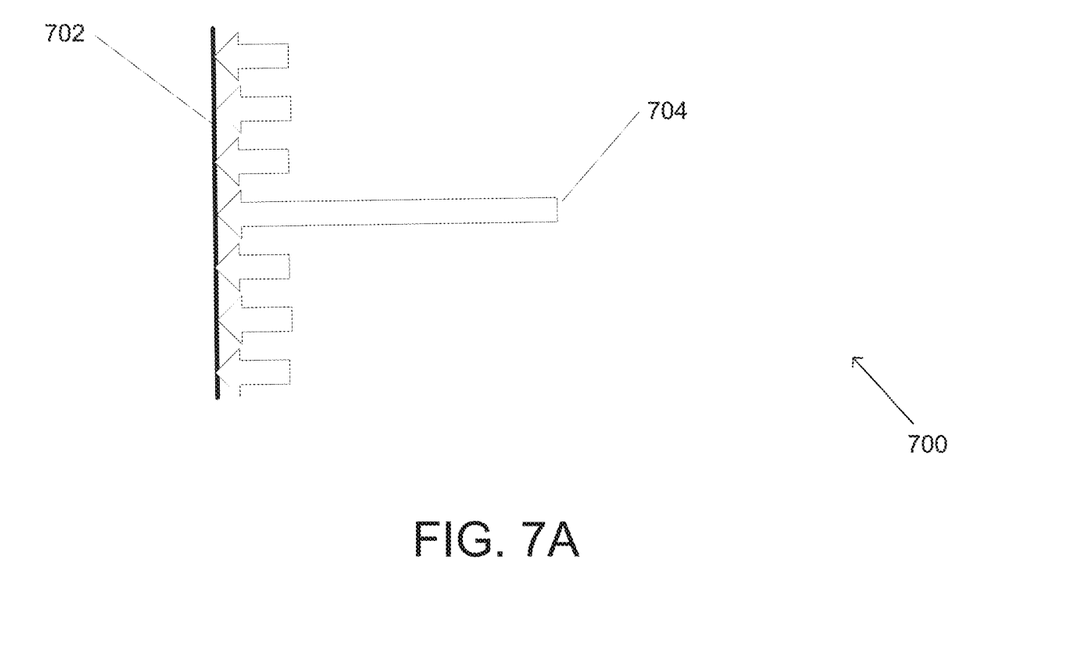
FIG. 7A is a force diagram showing a concentrated force on a wearer's back in accordance with an embodiment of the invention.

A force diagram showing a concentrated force on a wearer's back in accordance with a backpack which has not be fitted with the components of a magnetic backpack for changing load distribution on a wearer is shown in FIG. 7A. A first force distribution 700 may be applied to the user's back 702. A peak force 704 may be large relative to the rest of the distribution. Sometimes this peak force 704 may lead to discomfort in the user.

Figure 7B:
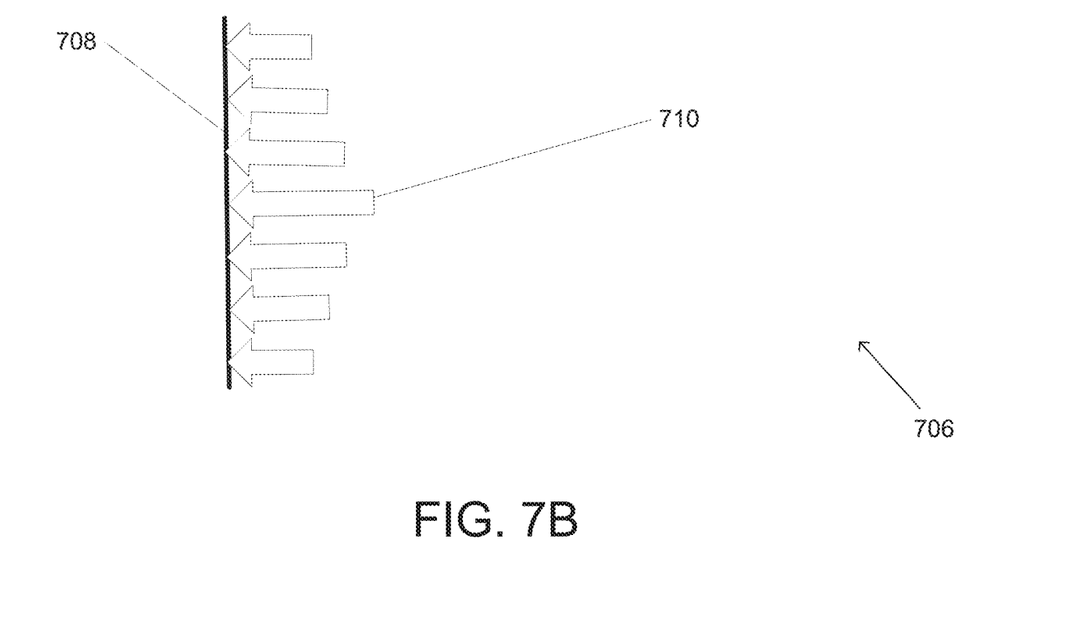
FIG. 7B is a force diagram showing a diffuse force on a wearer's back in accordance with an embodiment of the invention.

A force diagram showing a diffuse force on a wearer's back in accordance with an embodiment of the invention is shown in FIG. 7B. A second force distribution 706 may be applied to the user's back 708. A peak force 710 may be spread over a larger area by the backpack and therefore may be more comfortable for the user.

Although specific force distribution considerations are discussed above with respect to FIGS. 7A-B, any of a variety of force distributions can be obtained in accordance with embodiments of the invention. The heat transfer pattern considerations in accordance with embodiments of the invention are discussed further below.

Heat Transfer Considerations

Figure 10A:
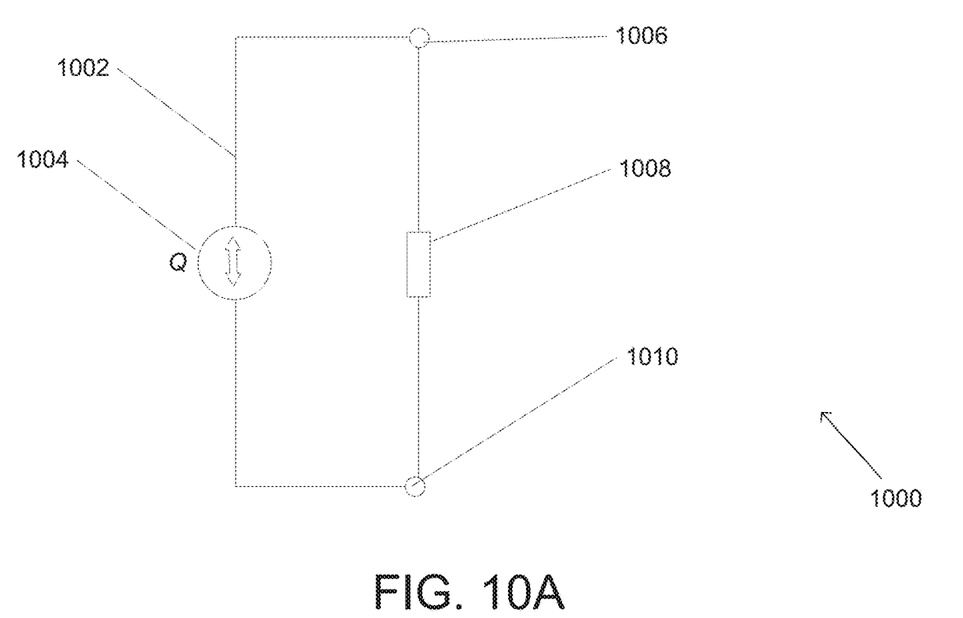
FIG. 10A is a thermal resistance diagram for a conventional backpack.

A thermal resistance diagram for a conventional backpack is shown in FIG. 10A. The heat transfer diagram 1000 is for a conventional backpack. A heat source 1004 may be placed inside or outside the backpack. In many embodiments, heat may flow through the heat circuit 1002 and pass through the various nodes. First convection thermal resistance 1006 may exist on the inner surface. Conduction thermal resistance 1008 occurs across the thickness of the material. Second convection thermal resistance 1010 may exist on the outer surface of the backpack wall. The total thermal resistance of this conventional backpack may be first convection thermal resistance 1006 plus conduction thermal resistance 1008 plus second convection thermal resistance 1010. The magnetic backpack may have properties that may increase the total thermal resistance of the backpack.

Figure 10B:
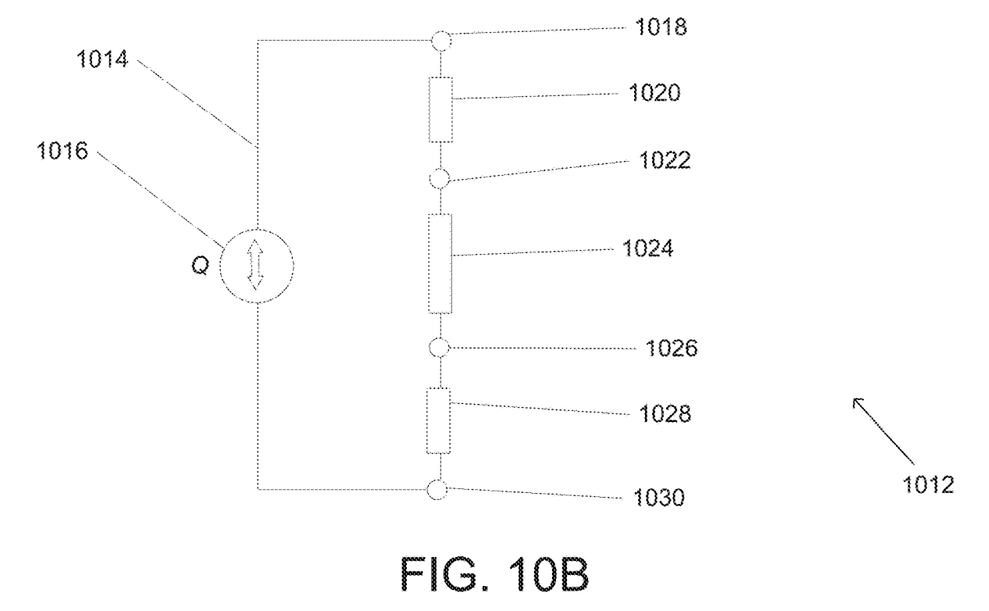
FIG. 10B is a thermal resistance diagram for the magnetic backpack in accordance with an embodiment of the invention.

A thermal resistance diagram for the magnetic backpack in accordance with an embodiment of the invention is shown in FIG. 10B. A heat transfer diagram 1012 is for a magnetic backpack. The heat source 1016 may be located inside or outside the backpack. In various embodiments, heat may flow through the heat circuit 1014 and pass through the various nodes. First convection thermal resistance 1018 may exist on the inner surface of the inner portion. First conduction thermal resistance 1020 may occur across the thickness of the material of the inner portion. Second convection thermal resistance 1022 may exist on the outer surface of the inner portion. Thermal resistance through the interstitial space 1024 could be, in various embodiments, conductive, radiative, or convective depending on the contents and pressure of the interstitial space. A third convection thermal resistance 1026 may exist on the inner surface of the outer portion. Second conduction thermal resistance 1028 may occur across the thickness of the material of the outer portion. Fourth convection thermal resistance 1030 may exist on the outer surface of the inner portion. The total thermal resistance of this conventional backpack may be first convection thermal resistance 1018 plus conduction thermal resistance 1020 plus second convection thermal resistance 1022 plus thermal resistance through the interstitial space 1024 plus third convection thermal resistance 1026 plus second conduction thermal resistance 1028 plus fourth convection thermal resistance 1030.

Although specific heat transfer considerations and arrangements are discussed above with respect to FIGS. 10A-B, any of a variety of heat transfer considerations and arrangements may be utilized in accordance with embodiments of the invention. Various arrangements of magnets or magnetic connective dampers, in accordance with embodiments of the invention are discussed further below.

Magnet Arrangements

Figure 9A:
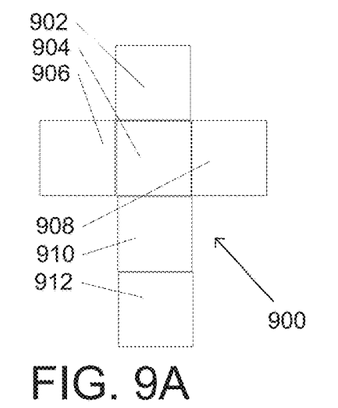
FIG. 9A is a schematic of an unfolded cube showing potential sides of the magnetic backpack that can be treated with magnetic surfaces in accordance with an embodiment of the invention.

Magnetic backpacks may include a various of magnet arrangements. A variety of magnet arrangements in accordance with an embodiment of the invention are illustrated in FIGS. 9A-I. In many arrangements the shaded areas may represent faces which have been treated with magnets, electromagnets, magnetic connective dampers, or electromagnetic connective dampers (collectively called magnets in this part). A schematic of an unfolded cube showing potential sides of the magnetic backpack that can be treated with magnetic surfaces in accordance with an embodiment of the invention is shown in FIG. 9A. As illustrated, a first arrangement 900 shows a backpack with no magnets. The first face 904 may face the back of a user. The second face 910 may face the ground when the pack is worn. The third face 912 may face away from a user's back. The fourth face 902 may face away from the ground. The fifth face 908 may face the user's right side. The sixth face 906 may face the left side.

Figure 9B:
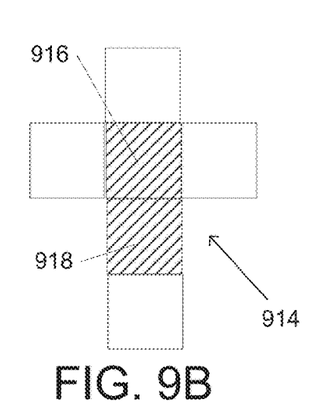
FIG. 9B-I are schematics of unfolded cubes showing magnetic surfaces in accordance with various embodiments of the invention.
Figure 9C:
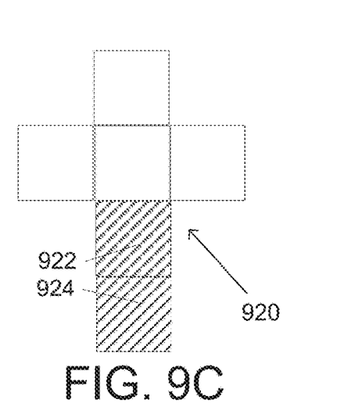
Figure 9D:
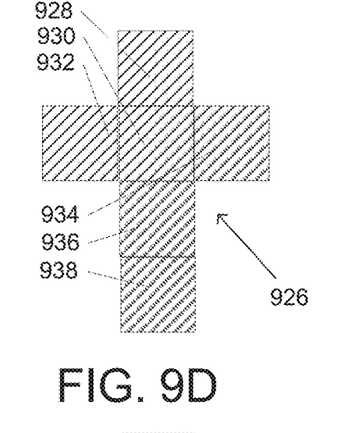
Figure 9E:
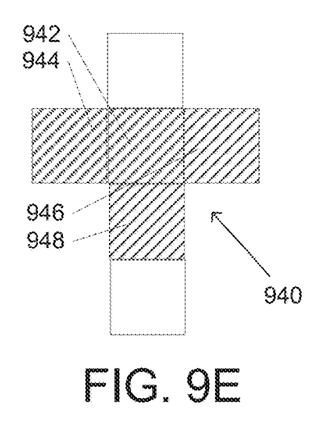
Figure 9F:
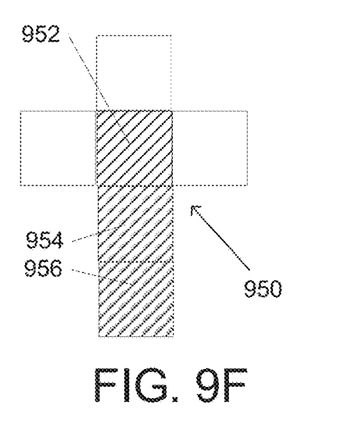
Figure 9G:
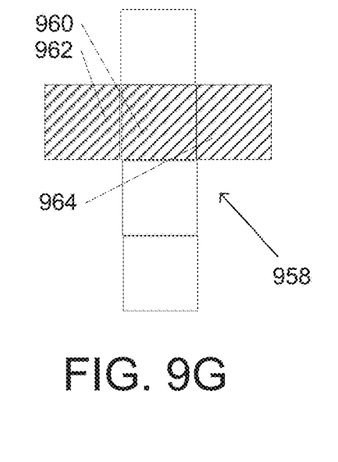
Figure 9H:
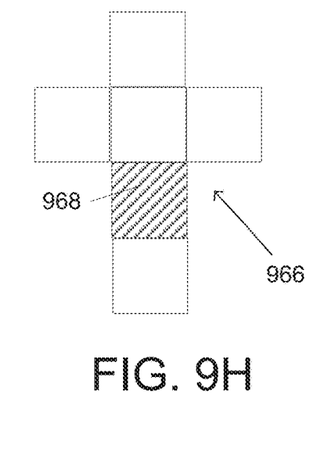
Figure 9I:
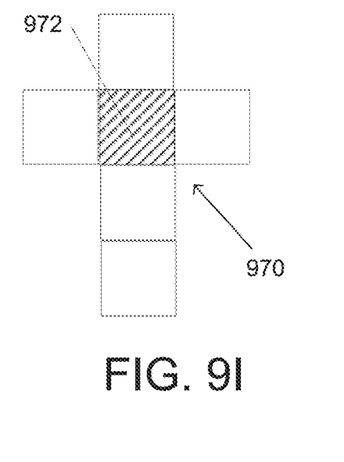

A schematic of unfolded cubes showing magnetic surfaces in accordance with various embodiments of the invention is shown in FIG. 9B. As illustrated, a second arrangement 914 may include a backpack that may have two surfaces treated with magnets. The treated surfaces are the treated back-facing surface 916 and the treated ground-facing surface 918. A schematic of unfolded cubes showing magnetic surfaces in accordance with various embodiments of the invention is shown in FIG. 9C. As illustrated, a third arrangement 920 may include a backpack that may have two surfaces treated with magnets. The treated surfaces are the treated ground-facing surface 922 and the treated outward facing surface 924. A schematic of unfolded cubes showing magnetic surfaces in accordance with various embodiments of the invention is shown in FIG. 9D. As illustrated, a fourth arrangement 926 may include a backpack that may have six surfaces treated with magnets. The treated surfaces are the treated back-facing surface 930, the treated ground-facing surface 936, the treated outward-facing surface 938, the treated upward-facing surface 928, the treated left-facing surface 932, and the treated right-facing surface 934. A schematic of unfolded cubes showing magnetic surfaces in accordance with various embodiments of the invention is shown in FIG. 9E. As illustrated, a fifth arrangement 940 may include a backpack that may have four surfaces treated with magnets. The treated surfaces are the treated back-facing surface 942, the treated ground-facing surface 948, the treated left-facing surface 944, and the treated right-facing surface 946. A schematic of unfolded cubes showing magnetic surfaces in accordance with various embodiments of the invention is shown in FIG. 9F. As illustrated, a sixth arrangement 950 may include a backpack that may have six surfaces treated with magnets. The treated surfaces are the treated back-facing surface 952, the treated ground-facing surface 954, the treated outward-facing surface 956. A schematic of unfolded cubes showing magnetic surfaces in accordance with various embodiments of the invention is shown in FIG. 9G. As illustrated, a seventh arrangement 958 may include a backpack that may have three surfaces treated with magnets. The treated surfaces are the treated back-facing surface 960, the treated left-facing surface 962, and the treated right-facing surface 964. A schematic of unfolded cubes showing magnetic surfaces in accordance with various embodiments of the invention is shown in FIG. 9H. As illustrated, a third arrangement 966 may include a backpack that may have one surface treated with magnets. The treated surface may be the ground-facing surface 968. A schematic of unfolded cubes showing magnetic surfaces in accordance with various embodiments of the invention is shown in FIG. 9I. As illustrated, a ninth arrangement 970 may include a backpack that may have one surface treated with magnets. The treated surface may be the treated back-facing surface 972.

Although specific magnet, electromagnet, magnetic connective dampers or electromagnetic connective damper arrangements are discussed above with respect to FIGS. 9A-1, any of a variety of magnet, electromagnet, magnetic connective dampers or electromagnetic connective damper arrangements can be obtained in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A backpack for changing load distribution on a user comprising:
   an outer portion comprising;
      a first compartment configured to hold an inner portion;
      a first closable opening;
   the inner portion positioned inside the outer portion comprising;
      a second compartment configured to hold a load;
      a second closable opening, wherein the first closable opening and second closable opening are aligned such that the load passes through the first closable opening and the second closable opening into the second compartment;
   a first plurality of magnets attached to the outer portion, wherein the first plurality of magnets is:
      oriented such that a consistent magnetic pole of each magnet of the first plurality of magnets points towards the first compartment; and
      constrained such that the distance between any two magnets of the first plurality of magnets is fixed;
   a second plurality of magnets attached to the inner portion, wherein the second plurality of magnets is;
      oriented such that a consistent magnetic pole of each magnet of the second plurality of magnets points towards the first compartment; and
      constrained such that the distance between any two magnets of the second plurality of magnets is fixed;
   wherein the first plurality of magnets is oriented such that a magnetic field of the first plurality of magnets exerts a repulsive force on the second plurality of magnets.

2. The backpack of claim 1, wherein the first plurality of magnets is oriented such that a magnetic pole of each magnet points perpendicularly to a closest surface of the inner portion.

3. The backpack of claim 1, wherein the second plurality of magnets is oriented such that a magnetic pole of each magnet points perpendicular to closest surface of outer portion.

4. The backpack of claim 1, wherein the first plurality of magnets is oriented such that a magnetic pole of each magnet points through an approximate center of volume of the inner portion.

5. The backpack of claim 1, wherein the second plurality of magnets is oriented such that a magnetic pole of each magnet points through an approximate center of volume of the inner portion.

6. The backpack of claim 1, wherein a space between the inner portion and the outer portion is airtight.

7. The backpack of claim 1, wherein the first plurality of magnets and the second plurality of magnets are electromagnets.

8. The backpack of claim 1, wherein the first plurality of magnets and the second plurality of magnets are permanent magnets.

9. The backpack of claim 1, wherein the outer portion and inner portion are both rigid.

10. The backpack of claim 1, wherein the first plurality of magnets is removably attached to the outer portion and the second plurality of magnets is removably attached to the inner portion.

11. A backpack for changing load distribution on a user comprising:
   an outer portion comprising;
      a first compartment configured to hold an inner portion;
      a first closable opening;
   the inner portion positioned inside the outer portion comprising;
      a second compartment configured to hold a load;
      a second closable opening, wherein the first closable opening and second closable opening are aligned such that the load passes through the first closable opening and the second closable opening into the second compartment;
   a magnetic connective damper comprising;
      a first magnet abutting the outer portion;
      a second magnet abutting the inner portion wherein the second magnet is arranged such that a consistent magnetic pole of both the first magnet and the second magnet points towards the space between the outer portion and the inner portion along a first axis wherein the first axis extends in a line from the first magnet to the second magnet;
      a flexible sleeve between the first magnet and second magnet wherein the flexible sleeve;
         permits the first and second magnet to translate along the first axis;
         permits the first magnet and the second magnet to translate along a second axis up to a maximum displacement magnitude wherein the second axis is perpendicular to the first axis; and
         prevents the first and second magnet from translating along the second axis in excess of the maximum displacement magnitude.

12. The backpack of claim 11, wherein a space between the inner portion and the outer portion is airtight.

13. The backpack of claim 11, wherein the first magnet and second magnet are electromagnets.

14. The backpack of claim 11, wherein the first magnet and second magnet are permanent magnets.

15. The backpack of claim 11, wherein the outer portion and inner portion are both rigid.

16. The backpack of claim 11, wherein the flexible sleeve is elastic along the first axis.

17. The backpack of claim 11, wherein the flexible sleeve is comprised of a plurality of rigid sections which translate relative to each other.

18. The backpack of claim 11, wherein the magnetic connective damper is removably attached to the outer portion and the inner portion.

19. The backpack of claim 11, wherein;
   the first magnet is attached to the outer portion;
   the second magnet is attached to the inner portion; and
   the flexible sleeve is connected to the first magnet at one end and the second magnet at the other.

20. The backpack of claim 11, wherein;
   the first magnet is attached to the flexible sleeve;
   the second magnet is attached to the flexible sleeve; and
   the flexible sleeve is removably attached to the outer portion and the inner portion.

* * * * *